United States Patent [19]

McFarlane

[11] Patent Number: 4,722,601
[45] Date of Patent: Feb. 2, 1988

[54] APPARATUS FOR DETERMINING THE DIRECTION OF A LINE OF SIGHT

[75] Inventor: Robert J. McFarlane, Lothian, Scotland

[73] Assignee: Ferranti plc, England

[21] Appl. No.: 632,249

[22] Filed: Jul. 19, 1984

[30] Foreign Application Priority Data

Jul. 23, 1983 [GB] United Kingdom ............... 8319883

[51] Int. Cl.⁴ .............................................. G01B 11/26
[52] U.S. Cl. .................... 356/152; 356/142; 356/252; 340/705; 350/174
[58] Field of Search ............... 356/142, 252, 152; 350/174; 33/230, 236, 318, 334; 340/705; 235/411

[56] References Cited

U.S. PATENT DOCUMENTS

| | | | |
|---|---|---|---|
| 2,752,684 | 7/1956 | Bentley, et al. | 33/230 |
| 2,871,565 | 2/1959 | Barth | 33/230 |
| 3,326,619 | 6/1967 | Johnson et al. | 33/236 |
| 3,892,474 | 7/1975 | Nilsson | 350/174 |
| 3,945,716 | 3/1976 | Kinder | 350/174 |
| 4,012,989 | 3/1977 | Hunt et al. | 33/236 |
| 4,028,725 | 6/1977 | Lewis | 235/411 |
| 4,167,113 | 9/1979 | Mann | 350/174 |
| 4,364,636 | 12/1982 | Ellis | 350/174 |
| 4,528,891 | 7/1985 | Brunello et al. | 356/252 |

OTHER PUBLICATIONS

"Eye-Ball Control" by Dan Boyle, Interavia, vol. 34, Sep. 1979, p. 874.
"A Helmet-Mounted Sight System", by Stephenson, et al., GEC Journal of Science and Technology, vol. #46, #1, 1980.

Primary Examiner—Stephen C. Buczinski
Assistant Examiner—Aaron J. Lewis
Attorney, Agent, or Firm—Larson and Taylor

[57] ABSTRACT

The apparatus comprises a sighting unit, such as helmet 10 carrying a cathode-ray tube 11 and a semi-reflecting screen 13 enabling a user to view a display superimposed on an outside scene. The sighting unit carries a detector unit 15 which determines the movements of the helmet 10 without reference to apparatus external to the helmet, and preferably comprising some form of gyroscopic apparatus. The helmet also carries a boresight detector 16 which forms part of correction means operable to correct automatically from time to time for errors in the output of the detector unit.

8 Claims, 3 Drawing Figures

APPARATUS FOR DETERMINING THE DIRECTION OF A LINE OF SIGHT

This invention relates to apparatus for determining the direction of a line of sight relative to a known reference frame, and is intended particularly though not exclusively, for use with helmet-mounted sighting or display devices.

A helmet-mounted sighting or display device usually provides a form of head-up display for the user. In the simplest form of display device a sighting mark or reticule is displayed on a semi-transparent surface located in front of the user's eyes. The user is able to see through the surface to view the outside scene, on which the reticule thus appears to be superimposed. In more complex forms of display a large and variable quantity of information may be superimposed on the user's view of the outside scene. Helmet-mounted displays of this type usually have the display produced by a small cathode-ray tube carried on the helmet itself. Clearly, sighting marks or other direction-indicating symbols are positioned relative to the line of sight of the user, and hence movements of the user's head must cause such marks or symbols to move. It is therefore necessary to detect movements of the user's head relative to a predetermined frame of reference.

A helmet-mounted sighting device may not have the semi-transparent surface to display projected information, but may use movements of the helmet to provide control signals for, say, a weapon guidance system.

It is known to use an electromagnetic system in which some form of radiator is carried by the reference frame and a number of sensor coils are carried on the user's helmet. The radiator and the sensor are arranged such that the orientation and position of the helmet in the magnetic field produced by the radiator is determined by the voltages induced in the sensor coils. Such an arrangement may be affected by adjacent metal work, particularly if this is movable.

Alternative arrangements use optical means for determining the position and orientation of the helmet. One such arrangement consists of a number of light sources mounted on the helmet, with two or more corresponding light-sensitive detectors mounted on the reference frame. Such an arrangement may prove to be unsatisfactory under high ambient light level conditions, and could be obscured by movements of objects such as the user's arms.

In both of the above known arrangements it is necessary to mount part of the apparatus on the helmet and part on the reference frame. This clearly is a disadvantage, and it is an object of the present invention to provide apparatus for detecting movement without reference to such external cooperating apparatus.

According to the present invention there is provided apparatus for determining the direction of a line of sight relative to a predetermined frame of reference, which includes a sighting unit defining said direction, a detector unit mounted on the sighting unit and operable to detect movements of the sighting unit without reference to apparatus external to the sighting unit, and correction means arranged to correct automatically from time to time for any errors in the output of the detector unit.

The invention will now be described with reference to the accompanying drawing, in which.

Figure 1:
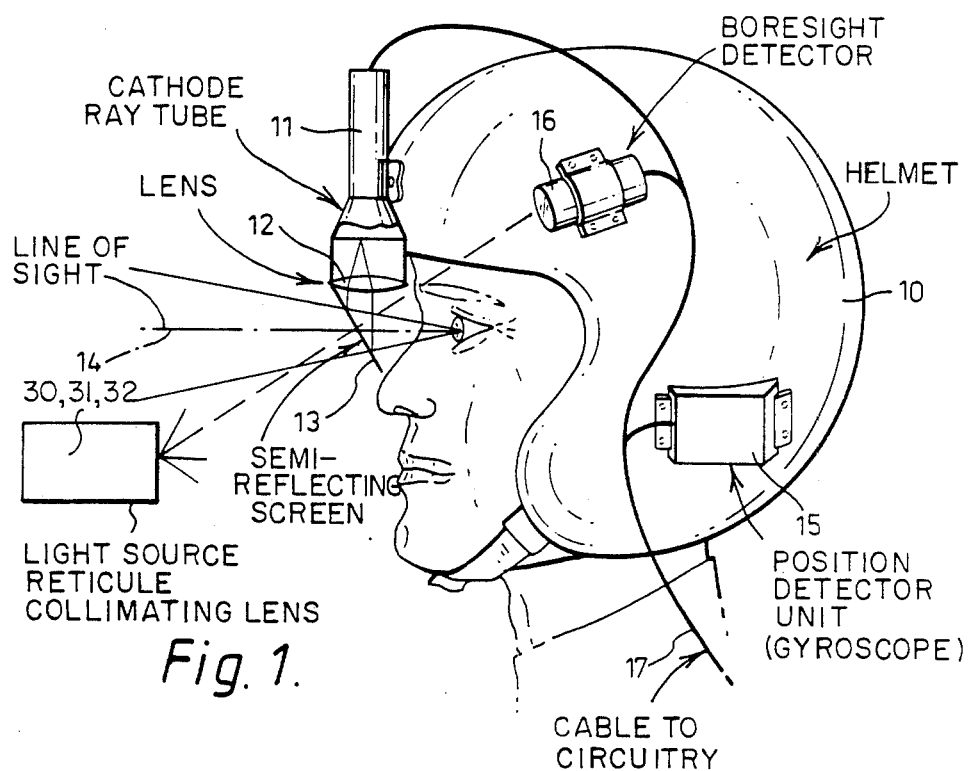
FIG. 1 is a schematic diagram of the sighting unit and its associated detector unit, according to a first embodiment.

Referring now to FIG. 1, this shows a helmet 10 to which is attached a cathode-ray tube 11, a lens 12 and a semi-reflecting screen 13. The latter is positioned in front of the user's eyes so that he may view an outside scene along a line of sight 14. Also carried on the helmet is the detector unit 15 which indicates the position of the helmet in the reference frame, and the active portion 16 of a boresight detector 16 which forms part of the correction means. The cathode-ray tube 11, detector unit 15 and boresight detector 16 are connected to external electronic circuitry by a cable 17.

In use, the user is able to move his head, and hence the helmet, through a limited angle in both elevation and azimuth. Movements about the sight line axis 14, that is "roll" movements, are less likely. Any required form display may be produced on the cathode-ray tube 11 for projection onto the screen 13, usually focussed at infinity so that the user does not have to adjust the focus of his eyes when viewing both the display and the oustide scene. If the display provides, say, a simple aiming mark or reticule, then movements of the helmet in azimuth and elevation will be required to cause opposite movements of the reticule. Arrangements for doing this are well known, as discussed above, using optical or electromagnetic means to determine the position of the helmet relative to the reference frame. The reference frame may be stationary, as in the case of a land-based missile tracking system, or may itself be movable, such as a ship or an aircraft.

Figure 2:
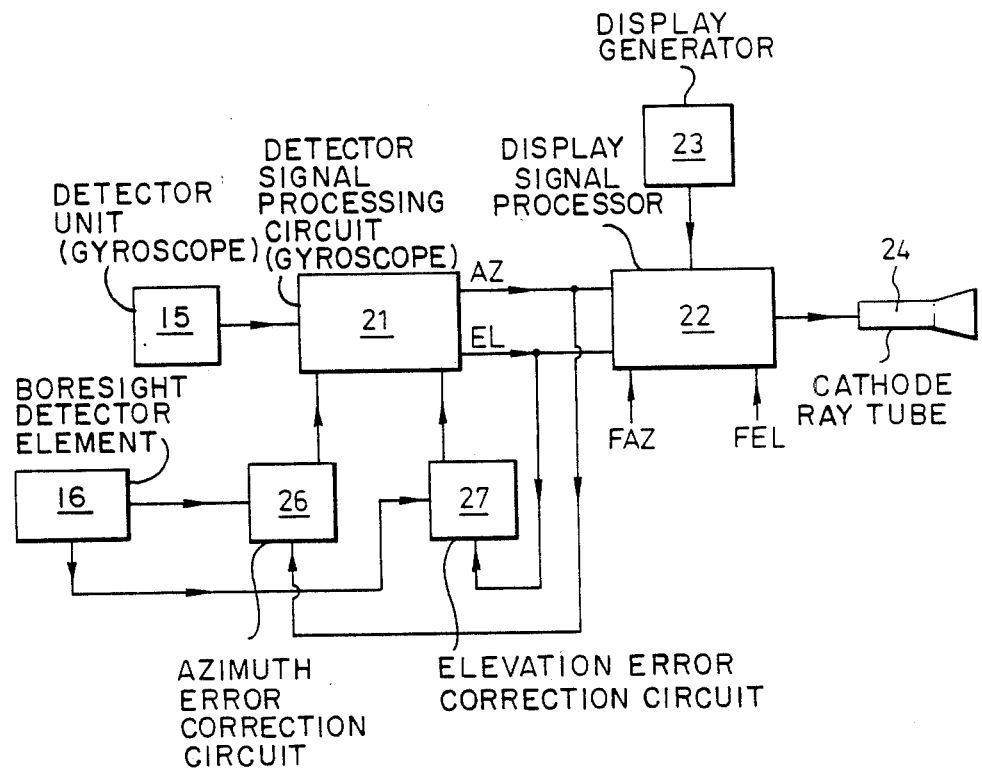
FIG. 2 is a schematic block diagram of the circuitry associated with the arrangement of FIG. 1.

FIG. 2 shows, in block schematic form, the electronics used according to the present invention. In the embodiment to be described, the detector unit 15 of FIG. 1 comprises an arrangement of gyroscopes arranged to detect movements of the helmet about the axiumuth and elevation axes. It is possible to use either two single-axis gyros or a single two-axis gryo as preferred. Referring to FIG. 2, the detector unit 15, which comprises the gyro or gyros just mentioned applies signals to a detector (gyro) signal processing circuit 21. This determines changes in the azimuth and elevation angles of the line of sight from the output signals produced by the gyro or gyros. These azimuth and elevation angles are applied to a display signal processor 22 controlling the cathode-ray tube display. The display itself is produced by a display generator 23, whilst the actual position of the display on the screen of the cathode-ray tube 24 is controlled by the display signal processor 22.

In the case of a sighting system the display generator 23 and cathode-ray tube 24 become unnecessary, and the display signal processor 22 becomes a guidance signal processor, with outputs fed by wire, radio or other means to, say, a missile or a gun control system.

For a gyro to be suitable for mounting on a helmet it must be of small size and weight. It is therefore likely to be more susceptible to errors, such as drift, than the larger and more accurate gyros commonly used on inertial platforms. It is therefore necessary to correct these errors from time to time before they become too large. This may readily be done by directing the line of sight in a known direction and then measuring and nullifying the errors in the system. However it is difficult to insist that the user must look in a particular direction at any instant, particularly in a combat situation. The apparatus of FIG. 2 therefore includes means for performing the corrections automatically, without any conscious act on the part of the user. It is assumed that the user's head and hence the helmet will, from time to time, move through a position at which the direction of the line of sight may be detected. It is not necessary for the helmet to become stationary in this position, but the detection of this predetermined orientation enables any errors existing at that instant to be determined and corrected. In addition, it is known to determine the drift erros in a gyro, using processing techniques and to predict and correct orientation errors. Such techniques may use recursive fading memory filters such as Kalman filters. In FIG. 2 a boresight detector element 25, which, as is explained below, may correspond to the active portion of the boresight detector indicated at 16 in FIG. 1 detects the passing of the sight line through the predetermined orientation and applies signals to azimuth and elevation error correction circuits 26 and 27 respectively. These circuits sample the azimuth and elevation outputs of the gyro signal processing circuit 21, and are able to apply appropriate corrections to that circuit.

Figure 3:
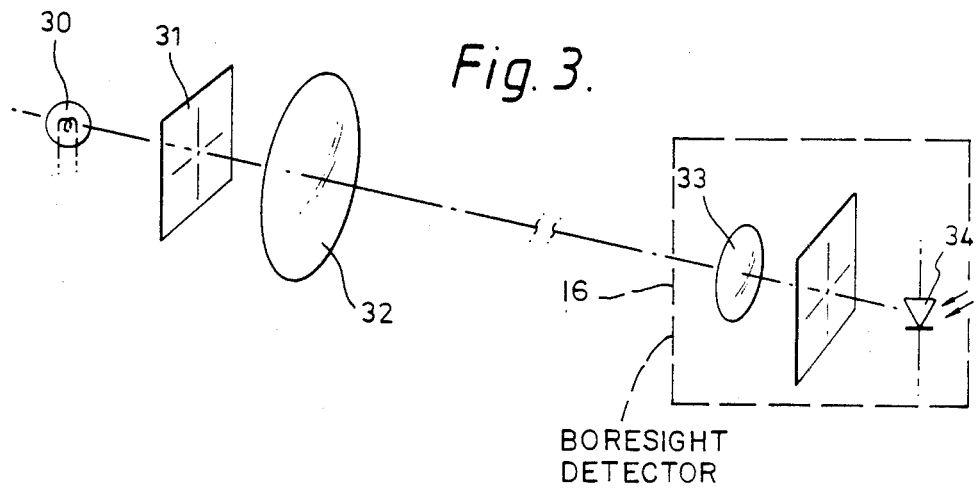
FIG. 3 is a schematic diagram of part of the correction means of FIG. 1.

The boresight detector is, in one form, an optical device having one part mounted on the helmet and the other part on the reference frame. One of the two parts, as shown in FIG. 3, consists of a light source 30 illuminating a reticule 31 of suitable shape and a collimating lens 32. The other part comprises a focussing lens 33 boresight detector element 25 which comprises a light-sensitive diode 34. The light from the source which illuminates the reticule 31 may be modulated or filtered in a particular manner to avoid confusion due to light from other sources. Preferably the two parts should be located so that the sight line direction is defined when the helmet is in a commonly-used position, so that error correction may take place as frequently as possible. To avoid the necessity for mounting the two parts separately, one on the helmet and one on the reference frame, both parts may be located together on the reference frame by using a corner reflector or other suitable reflector on the helmet. Alternatively the reflector may be fitted to the reference frame with the source and detector both carried on the helmet. Less critical arrangements could be used employing an array of light sources and a suitable detector such that a degree of misalignment may be tolerated. This misalignment is measured and is used by the alignment correction circuitry. Such an arrangement makes misalignment about the roll axis easier to measure and correct.

Other boresight alignment techniques may be used using, for example, narrow beams of ultrasonic or microwave energy in place of the optical arrangement described above.

The embodiment described above uses one or more gyros to determine the orientation of the helmet and hence of the sight line. This operates without the need for external components mounted on the reference frame, except for error correction purposes. Other position detectors may also be used which do not require other cooperating components. One such device is the laser ring gyroscope. This is a single axis device, and hence two of these would have to be attached to the helmet in the correct relative positions.

Another suitable device, also operating about a single axis only, is the interferometric gyro in which coherent light is passed in opposite directions along a long optical path. In this case the optical path could comprise a long optical fibre arranged in a coil inside the helmet.

It the apparatus is to be used with a movable reference frame, such as a ship or an aircraft, then account has to be taken of the fact that any of the types of position detectors referred to above measure position, or orientation, with respect to free space. With a stationary reference frame the orientation is easily related to that frame. If the frame is moving, however, then allowance has to be made for such movement. Hence it is necessary to apply to the processor 22 of FIG. 2 inputs from the ship or aircraft's own inertial platform so that movements of the reference frame may be off set against movements indicated by the helmet detector unit. Such signals are indicated in FIG. 2 as FAZ (frame azimuth) and FEL (frame elevation) inputs.

What we claim is:

1. Apparatus for determining the direction of a line of sight relative to a predetermined frame of reference, said apparatus comprising a helmet, a display device carried by the helmet, a semi-reflecting screen mounted on the helmet and onto which, in use, a display is projected by the display device, a detector unit mounted on the helmet and operable without reference to apparatus separate from the helmet to provide outputs indicative of movements for the helmet relative to the frame of reference, and correction means for correcting automatically from time to time errors in the outputs of the detector unit, said correction means including a boresight detector for defining and detecting a datum direction of the line of sight relative to the reference frame, and a correction circuit responsive to the boresight detector for correcting said errors whenever the datum direction is attained.

2. Apparatus as claimed in claim 1 in which the display device comprises a cathode-ray tube.

3. Apparatus as claim in claim 1 in which the detector unit includes gyroscopic apparatus having two perpendicular sensitive axes defining the azimuth and elevation angles of the sight line relative to the reference frame.

4. Apparatus as claimed in claim 3 in which the gryroscopic apparatus comprises a single two-axis gyroscope.

5. Apparatus as claimed in claim 3 which includes a display generator for driving the display device and a display signal processor for moving the display produced by the display device to compensate for movements of the helmet.

6. Apparatus as claimed in claim 1 in which the boresight detector includes a source of collimated light and a light-sensitive detector together located so as to define said datum direction of the line of sight.

7. Apparatus as claimed in claim 6 in which one of the source and the detector is mounted on the helmet and the other is mounted on the reference frame.

8. Apparatus as claimed in claim 6 in which the source and the detector are both mounted on the reference frame and a reflecting member is mounted on the helmet.

* * * * *